(12) United States Patent
Ha et al.

(10) Patent No.: US 10,778,966 B2
(45) Date of Patent: Sep. 15, 2020

(54) DISPLAY DEVICE AND METHOD FOR CONTROLLING DISPLAY DEVICE

(71) Applicant: Samsung Electronics Co., Ltd., Suwon-si, Gyeonggi-do (KR)

(72) Inventors: Jung Su Ha, Osan-si (KR); Yong Seob Yun, Suwon-si (KR); Gi Sang Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/087,748

(22) PCT Filed: Mar. 8, 2017

(86) PCT No.: PCT/KR2017/002518
§ 371 (c)(1),
(2) Date: Sep. 24, 2018

(87) PCT Pub. No.: WO2017/164545
PCT Pub. Date: Sep. 28, 2017

(65) Prior Publication Data
US 2019/0089949 A1   Mar. 21, 2019

(30) Foreign Application Priority Data

Mar. 24, 2016   (KR) .................. 10-2016-0035337

(51) Int. Cl.
*H04N 13/398* (2018.01)
*G06F 3/0488* (2013.01)
(Continued)

(52) U.S. Cl.
CPC ........... *H04N 13/398* (2018.05); *G02B 30/26* (2020.01); *G02B 30/56* (2020.01); *G06F 3/041* (2013.01);
(Continued)

(58) Field of Classification Search
CPC .............. H04N 13/398; H04N 5/4403; H04N 5/23238; H04N 13/351; H04N 13/302;
(Continued)

(56) References Cited

U.S. PATENT DOCUMENTS

| 2005/0180007 A1 | 8/2005 | Cossairt et al. |
| 2009/0189917 A1 | 7/2009 | Benko et al. |

(Continued)

FOREIGN PATENT DOCUMENTS

| EP | 2 669 822 A2 | 12/2013 |
| EP | 2669822 | * 12/2013 |

(Continued)

OTHER PUBLICATIONS

Grossman et al., "Multi-Finger Gestural Interaction with 3D Volumetric Displays", Department of Computer Science, University of Toronto, vol. 6, Issue 2; pp. 61-70; Oct. 24, 2004. (Year: 2004).*

(Continued)

*Primary Examiner* — James M Pontius
(74) *Attorney, Agent, or Firm* — Jefferson IP Law, LLP

(57) ABSTRACT

Disclosed is a display apparatus including a user interface implemented in a spherical form, and at least one processor configured to control the user interface so that a three-dimensional image photographed at 360 degrees is displayed on the user interface.

18 Claims, 13 Drawing Sheets

(51) Int. Cl.
*H04N 13/30* (2018.01)
*G06F 3/041* (2006.01)
*G02B 30/26* (2020.01)
*G02B 30/56* (2020.01)
*H04N 13/302* (2018.01)
*H04N 13/351* (2018.01)
*H04N 5/232* (2006.01)
*H04N 5/44* (2011.01)
*G06F 3/0481* (2013.01)
*G06F 3/16* (2006.01)

(52) U.S. Cl.
CPC ....... G06F 3/0488 (2013.01); H04N 5/23238 (2013.01); H04N 5/4403 (2013.01); H04N 13/30 (2018.05); H04N 13/302 (2018.05); H04N 13/351 (2018.05); *G06F 3/0481* (2013.01); *G06F 3/16* (2013.01); *G06F 2203/04102* (2013.01); *G06F 2203/04104* (2013.01); *H04N 2005/443* (2013.01)

(58) Field of Classification Search
CPC ............. H04N 2005/443; H04N 13/30; H04N 13/307; G06F 3/041; G06F 3/0488; G06F 2203/04104; G06F 2203/04102; G06F 3/0481; G06F 3/16; G06F 3/04815; G06F 3/017; G02B 27/225; G02B 27/2292
See application file for complete search history.

(56) References Cited

U.S. PATENT DOCUMENTS

2013/0088488 A1* 4/2013 Hong .................. H04N 13/366
   345/419
2016/0085332 A1    3/2016 Herrera-Morales et al.

FOREIGN PATENT DOCUMENTS

| JP | 2006-212717 A | 8/2006 |
| KR | 10-2014-0126186 A | 10/2014 |
| KR | 10-2015-0118753 A | 10/2015 |
| KR | 10-2016-0015925 A | 2/2016 |

OTHER PUBLICATIONS

Grossman et al., Multi-Finger Gestural Interaction with 3D Volumetric Displays, Department of Computer Science, University of Toronto, vol. 6, Issue 2; Oct. 24, 2004.

European Search Report dated Mar. 7, 2019, issued in European Patent Application No. 17770516.7.

European Search Report, issued in EP 2 669 822, cited in European Search Report dated Mar. 7, 2019.

Benko et al.; "Sphere: Multi-Touch Interactions on a Spherical Display"; UIST '08 Proceedings of the 21st annual ACM symposium on User interface software and technology pp. 77-86; Monterey, CA, USA—Oct. 19 22, 2008; ISBN: 9781595939753.

* cited by examiner

DISPLAY DEVICE AND METHOD FOR CONTROLLING DISPLAY DEVICE

TECHNICAL FIELD

The present disclosure relates to a display apparatus for displaying an image and a control method of the display apparatus.

BACKGROUND ART

A display apparatus is an apparatus for outputting visual and stereoscopic images.

The display apparatus may have a function of receiving a broadcast signal transmitted from an image transmission apparatus or a broadcast server of as a broadcasting station to display an image, displaying an image received through an internet network, or processing image data stored in a storage medium to display an image.

Such display apparatus includes one or more components that perform different functions in order to provide images to a user, and the quality of the image provided to the user varies depending on the implementation form or function of each component.

Since a conventional display apparatus is implemented as a plane so that only an image for one side of an object or a landscape is provided to a user, it is difficult for the user to view an image provided by the display apparatus unless the user views the display apparatus from a limited angle.

DISCLOSURE OF INVENTION

Technical Problem

Therefore, it is an aspect of the present disclosure to provide a display apparatus capable of displaying a three-dimensional image photographed at 360 degrees through a user interface implemented in a spherical form and a control method of the display apparatus.

It is another aspect of the present disclosure to provide a display apparatus capable of providing a three-dimensional image photographed at 360 degrees so that a user can view an image at various angles through a user interface implemented in a spherical form and a control method of the display apparatus.

Technical Solution

In accordance with one aspect of the present disclosure, a display apparatus may include a user interface implemented in a spherical form, and a controller configured to control the user interface so that a three-dimensional image photographed at 360 degrees is displayed on the user interface.

The user interface may be implemented as a flexible display to directly display a three-dimensional image photographed at 360 degrees according to a control signal of the controller.

The user interface may include at least one projector for irradiating a beam, and a stereoscopic projection plate for projecting the beam irradiated from the at least one projector.

The user interface may include a display implemented as a touch screen device.

The display apparatus may further include a sensing device for sensing an action of a user, and the controller may generate a control signal so that the user interface outputs image content corresponding to the sensed action of the user.

The sensing device may sense actions of a plurality of users, and the controller may generate a control signal so that the user interface individually outputs image contents corresponding to the actions of the plurality of users, respectively.

The user interface may include a display for displaying a three-dimensional image photographed at 360 degrees, and an input for receiving a command of a user, and the controller may generate a control signal so that the display outputs image content corresponding to the command of the user.

The input may receive commands of a plurality of users, and the controller may generate a control signal so that the display individually outputs image contents corresponding to the commands of the plurality of users, respectively.

The action of the user may include at least one of the user's position, gesture, mouth shape, facial expression, and sound.

The display apparatus may further include a sensing device for sensing a condition of the display apparatus or the surrounding environment, and the controller may generate a control signal so that the user interface outputs image content corresponding to the sensed condition or the surrounding environment.

The display apparatus may further include a support for supporting the user interface.

The display apparatus may further include a storage for storing three-dimensional image data photographed at 360 degrees, and the controller may control the user interface so that the three-dimensional image photographed at 360 degrees is displayed based on the three-dimensional image data photographed at 360 degrees stored in the storage.

The display apparatus may further include a communicator for receiving three-dimensional image data photographed at 360 degrees, and the controller may control the user interface so that the three-dimensional image photographed at 360 degrees is displayed based on the three-dimensional image data photographed at 360 degrees received by the communicator.

The display apparatus may be implemented as a head or an eye of a robot.

In accordance with another aspect of the present disclosure, a control method of a display apparatus may include displaying a three-dimensional image photographed at 360 degrees on a user interface implemented in a spherical form, sensing an action of a user, and displaying image content corresponding to the action of the user on the user interface.

The control method may further include receiving a command of the user, and displaying other image content corresponding to the command of the user on the user interface.

The user interface may be implemented as a touch screen device.

The control method may further include sensing a condition of the display apparatus or the surrounding environment, and outputting image content corresponding to the sensed condition or the surrounding environment.

The control method may further include fetching three-dimensional image data photographed at 360 degrees from a storage before the displaying of the three-dimensional image photographed at 360 degrees, and generating the three-dimensional image photographed at 360 degrees based on the three-dimensional image data photographed at 360 degrees.

The control method may further include receiving three-dimensional image data photographed at 360 degrees by a communicator before the displaying of the three-dimensional image photographed at 360 degrees, and generating the three-dimensional image photographed at 360 degrees based on the three-dimensional image data photographed at 360 degrees.

Advantageous Effects

When the display apparatus and the control method of the display apparatus according to the disclosed embodiments are used, the user can obtain a stereoscopic effect and an aesthetic sense as if an object or a landscape represented by the three-dimensional image photographed at 360 degrees is actually present inside the user interface having a spherical form.

Further, when the display apparatus and the control method of the display apparatus according to the disclosed embodiments are used, the user can view the object or the landscape represented by the three-dimensional image photographed at 360 degrees from various angles.

Further, when the display apparatus and the control method of the display apparatus according to the disclosed embodiments are used, image content corresponding to the position of the user can be variously output on the user interface in a spherical form.

Further, when a plurality of users view the user interface using the display apparatus and the control method of the display apparatus according to the disclosed embodiments, the respective users can view different sides of the object or the landscape depending on the angle at which each user views the user interface.

MODE FOR INVENTION

Figure 1:
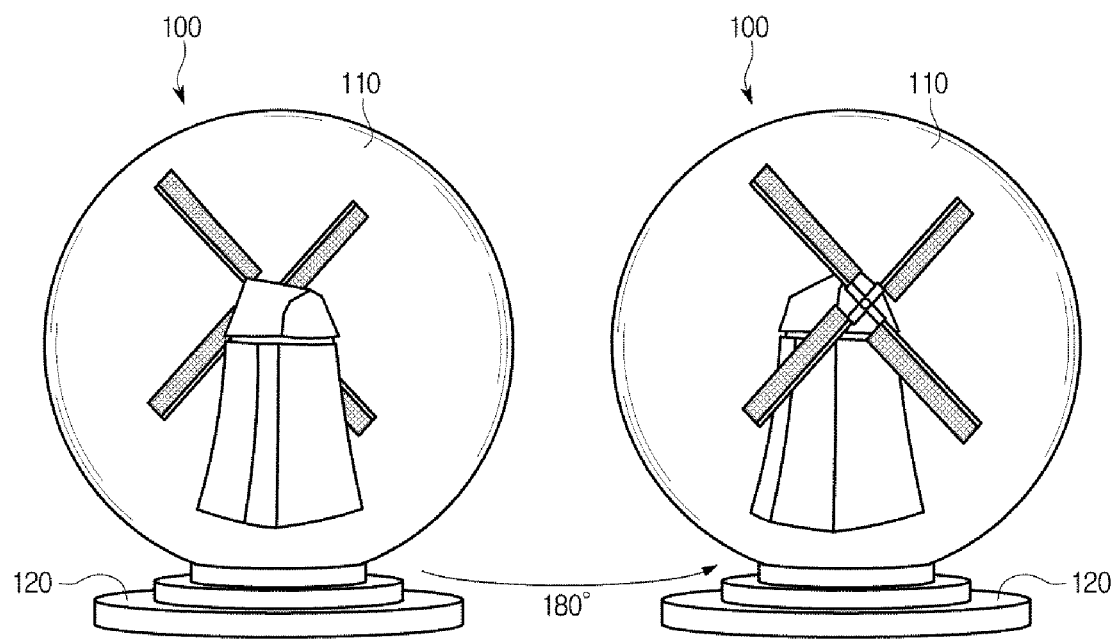
FIG. 1 illustrates an external view of a display apparatus according to an embodiment of the present disclosure.

The objectives, specific advantages and novel features of the present disclosure will become more apparent from the following detailed description taken in conjunction with the accompanying drawings. It should be noted that in designating reference numerals for components in the present specification, the same components have the same numbers to the greatest extent possible even if they are shown in different drawings. In the following description of the present disclosure, a detailed description of known related arts will be omitted when it is determined that the gist of the present disclosure may be unnecessarily obscured. In the present specification, the terms first, second, etc. are used to distinguish one element from another element, and the element is not limited by the terms.

Hereinafter, embodiments of a display apparatus and a control method of the display apparatus according to the present disclosure will be described in detail with reference to the accompanying drawings.

Figure 2:
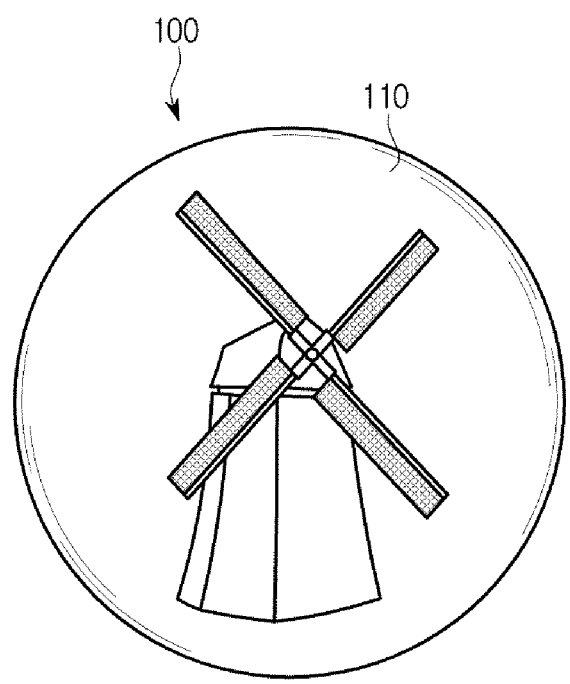
FIG. 2 illustrates an external view of a display apparatus according to another embodiment of the present disclosure.
Figure 3:
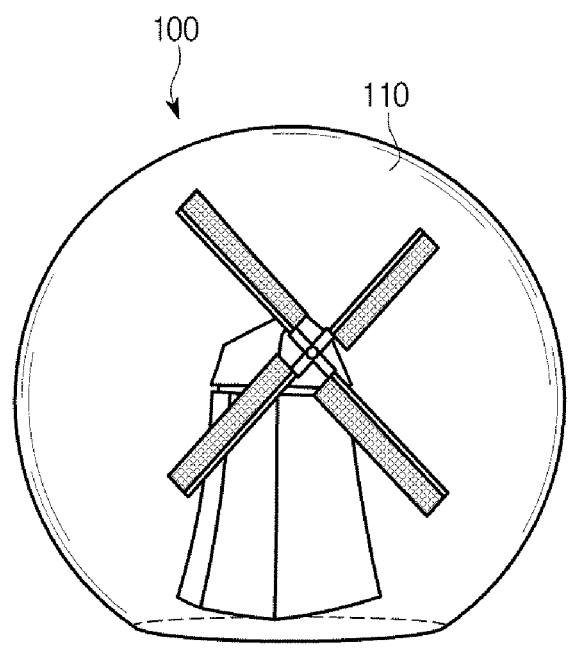
FIG. 3 illustrates an external view of a display apparatus according to another embodiment of the present disclosure.

FIG. 1 illustrates an external view of a display apparatus according to an embodiment, FIG. 2 illustrates an external view of a display apparatus according to another embodiment, and FIG. 3 illustrates an external view of a display apparatus according to another embodiment.

Referring to FIG. 1, a display apparatus 100 according to an embodiment of the present disclosure receives a broadcast signal transmitted from a broadcasting station or an image signal received through a wired/wireless communication network and displays an image. Also, the display apparatus 100 may process image data stored in a storage medium to display an image.

For example, the display apparatus 100 may display an image by receiving analog and digital broadcast signals individually according to the channel selection using one tuner, or may display an image by receiving analog and digital broadcast signals individually or simultaneously using a plurality of tuners. The display apparatus 100 may not only display an image but also output a sound. Herein, the sound may be output through a device provided outside the display apparatus 100.

The display apparatus 100 according to an embodiment includes a user interface 110 implemented in a spherical form and a support 120 supporting the user interface 110.

The user interface 110, which is an apparatus for displaying an image, may not only display an image but also function as an input by including a touch sensor.

The image displayed by the user interface 110 includes a three-dimensional image photographed at 360 degrees. An image photographed at 360 degrees is an image including not only information about one side of an object or a landscape but also information about other sides, and may be a set of a plurality of plane images simultaneously photographed at a plurality of points of 0 degrees or more and 360 degrees or less based on a point spaced a predetermined distance away from the object. A three-dimensional image means an image stereoscopically representing an object or a landscape.

A three-dimensional image photographed at 360 degrees means an image that stereoscopically represents an object or a landscape and further includes information about not only one side of the object or the landscape but also information about other sides.

For example, as illustrated in FIG. 1, when the user interface 110 viewed from any one angle indicates the front surface of an object, the rear surface of the user interface 110, that is, the surface that is viewed when the user interface 110 is rotated by 180 degrees, represents the rear surface of the object. Accordingly, when a plurality of users view the user interface 110, the object or the landscape may be viewed differently depending on the angle at which each user views the user interface 110.

For example, a stereo matching method may be used as a method of generating a three-dimensional image photographed at 360 degrees. However, the present disclosure is not limited thereto, and a 360-degree three-dimensional image may be generated by various methods.

The support 120 supports the user interface 110 implemented in a spherical form.

The support 120 may be provided with a button and the like on its outer surface to allow a user to input various control commands.

Also, the support 120 may include therein various components necessary for the user interface 110 to display a three-dimensional image photographed at 360 degrees.

On the other hand, referring to FIG. 2, in the display apparatus 100 according to another embodiment, the support 120 may be omitted, and various components for displaying a three-dimensional image photographed at 360 degrees may be provided directly inside the user interface 110 implemented as a spherical form.

Further, referring to FIG. 3, in the display apparatus 100 according to another embodiment, when the support 120 is omitted, the user interface 110 may be implemented in a stereoscopic form different from the spherical form so as to be erected on the ground. In this case, the user interface 110 may be implemented by cutting a part of a sphere.

Figure 4:
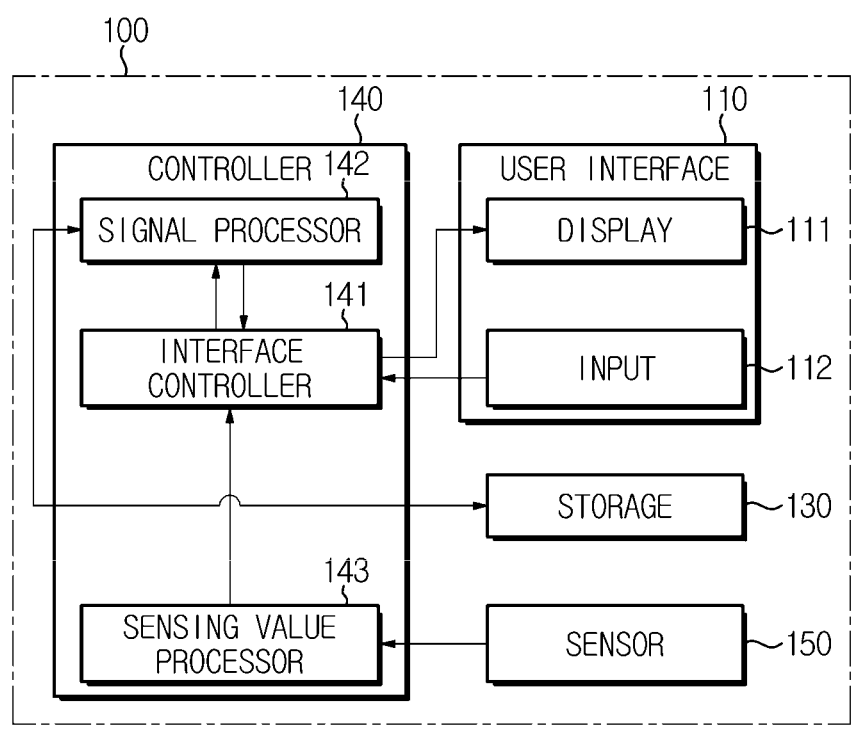
FIG. 4 illustrates a control block diagram of a display apparatus according to an embodiment of the present disclosure.

Hereinafter, a detailed configuration of the display apparatus 100 according to an embodiment of this disclosure will be described. FIG. 4 illustrates a control block diagram of a display apparatus according to an embodiment of the present disclosure.

The display apparatus 100 includes the user interface 110, a storage 130, a controller 140, and a sensing device 150. The display apparatus 100 may further include the support 120 described above with reference to FIG. 1.

The user interface 110 includes a display 111 for displaying a three-dimensional image photographed at 360 degrees and an input 112 for receiving a command of a user. The user interface 110 may be the same as or different from the user interface 110 described above with reference to FIGS. 1 to 3.

The display 111 may be implemented as a flexible display or a three-dimensional display to display a three-dimensional image directly photographed at 360 degrees. In this case, the display 111 may be implemented using a plasma display panel (PDP), a light emitting diode (LED) panel, a liquid crystal display (LCD) panel, or the like.

Further, the display 111 may be implemented to include at least one projector and a stereoscopic projection plate for projecting a beam irradiated by the projector and displaying a three-dimensional image photographed at 360 degrees. In this case, a user may view the three-dimensional image photographed at 360 degrees on the outer surface, which is the opposite surface to the inner surface of the display 111 on which the beam is projected.

The display 111 displays a three-dimensional image photographed at 360 degrees to a user. Also, the display 111 may output image content corresponding to a command of a user according to a control signal of the controller 140. Also, the display 111 may output image content corresponding to at least one user position according to a control signal of the controller 140. Also, the display 111 may output image content corresponding to the surrounding environment according to a control signal of the controller 140. Image contents output by the display 111 will be described later.

The display 111 may include a touch screen device. When the display 111 includes the touch screen device, the display 111 may also perform the function of the input 112, which will be described later. The touch screen device may be implemented using a pressure sensitive touch screen panel or an electrostatic touch screen panel. Also, the touch screen device may be implemented using a touch screen panel using ultrasonic waves or infrared rays.

The input 112 may be implemented by a button, a joystick, or a jog dial in addition to the touch screen device.

The input 112 may be coupled to the display 111 on the display 111, but may be implemented on the support 120 described above with reference to FIG. 1.

The input 112 receives various commands of a user.

For example, when the display 111 displays a plurality of icons, the input 112 may receive a user command for selecting any one icon.

As another example, the input 112 may receive a user command and a rotation angle to physically rotate the display 111 on the support 120 of FIG. 1.

As another example, the input 112 may receive a user command and a rotation angle to rotate a three-dimensional image photographed at 360 degrees displayed on the display 111. In this case, a user may adjust a desired rotation angle in such a manner that the user drags a finger at any one point on the display 111 without releasing the finger and then releases the finger at any other point.

As another example, the input 112 may receive a wake-up command for instructing to display a three-dimensional image photographed at 360 degrees in a state in which the display 111 does not display the three-dimensional image photographed at 360 degrees.

In addition, since the input 112 may receive various user commands, the present disclosure is not limited to the above-described examples.

The storage 130 may be implemented as a memory, and may be implemented as an internal memory installed in the manufacturing process or an external memory capable of being attached and detached.

The storage 130 stores programs and data necessary for the controller 140 to control the display apparatus 100. As an example, the storage 130 stores data for an image photographed at 360 degrees (hereinafter, referred to as 360-degree photographed three-dimensional image data).

Also, the storage 130 may store set values preset for each component in the manufacturing process of the display apparatus 100, and setting values set by a user for each component in the process of using the display apparatus 100.

The controller 140 generates control signals for controlling the respective components of the display apparatus 100.

The controller 140 includes an interface controller 141, a signal processor 142, and a sensing value processor 143, which are classified according to functions to be performed. Each component of the controller 140 may be implemented as an independent module, and may be implemented as a single module.

The interface controller 141 generates a control signal for controlling the display 111 and controls other components based on the user commands input to the input 112.

For example, the interface controller 141 generates a control signal so that the display 111 displays a three-dimensional image photographed at 360 degrees generated by the signal processor 142.

Also, the interface controller 141 may generate a control signal so that the display 111 displays image content corresponding to the inputted user command. For example, when a user inputs a wake-up command in a state in which the display 111 does not display a three-dimensional image photographed at 360 degrees, the interface controller 141 may generate a control signal so that the display 111 again displays the three-dimensional image photographed at 360 degrees previously displayed. In addition, when a user selects any one icon, the interface controller 141 may generate a control signal so that the display 111 displays image content corresponding to the icon.

Also, the interface controller 141 may generate a control signal so that the display 111 displays image content corresponding to the sensing result value generated by the sensing value processor 143. For example, when the distance between a user and the display apparatus 100 is less than a preset reference distance, the interface controller 141 may cause the display 111 to output image contents to any one point of the display 111 corresponding to the position of the user. Also, when the user is authenticated, the interface controller 141 may cause the display 111 to output image contents that can be displayed to the authenticated user. Also, the interface controller 141 may cause the display 111 to output image contents based on the sensing result of the sensing value processor 143 for various actions of a user such as the user's gesture, mouth shape, facial expression, and sound.

In order to generate image content corresponding to the user command input from the input 112 or the sensing result value of the sensing value processor 143, the interface controller 141 may generate a control signal for controlling the signal processor 142. Based on a control signal of the controller 140, the signal processor 142 may generate image content corresponding to the user command or the sensing result value.

The signal processor 142 generates a three-dimensional image photographed at 360 degrees based on the data stored in the storage 130.

Also, the signal processor 142 generates image content corresponding to the user command inputted from the input 112 or the sensing result value of the sensing value processor 143 based on a control signal of the interface controller 141.

The sensing value processor 143 determines various actions of a user such as the position, gesture, mouth shape, facial expression, and sound of the user based on a sensing value of the sensing device 150, determines the surrounding environment of the display apparatus 100, a condition of the display apparatus 100, and the like, and generates a sensing result value. The sensing result value generated by the sensing value processor 143 may be provided to the interface controller 141. For example, the sensing value processor 143 may determine the position of each of a plurality of users, and may determine the distance between each user and the display apparatus 100.

Also, the sensing value processor 143 may authenticate a user based on the sensing value of the sensing device 150.

The signal processor 142, the interface controller 141, and the sensing value processor 143 may include a memory for storing programs and data for performing respective functions, and a processor for generating control signals according to the programs and data stored in the memory. According to an embodiment, the signal processor 142, the interface controller 141, and the sensing value processor 143 may be implemented as separate memories and processors, respectively, or as a single memory and processor.

The sensing device 150 senses various actions of a user such as the user's position, gesture, mouth shape, facial expression, and sound or the user's authentication information (e.g., iris information, fingerprint information), or senses a condition of the display apparatus 100 or the surrounding environment. For example, the sensing device 150 may include various known sensors capable of sensing the voice or motion of a user, such as a camera, a microphone, an ultrasonic sensor, an infrared sensor, a micro radiowave sensor, and an electromagnetic sensor. In addition, the sensing device 150 may include various known sensors capable of sensing a condition of the display apparatus 100 or the surrounding environment such as a Global Positioning System (GPS), a temperature sensor, a humidity sensor, an acceleration sensor, a dust sensor, a gas sensor, or a tactile sensor.

Figure 5:
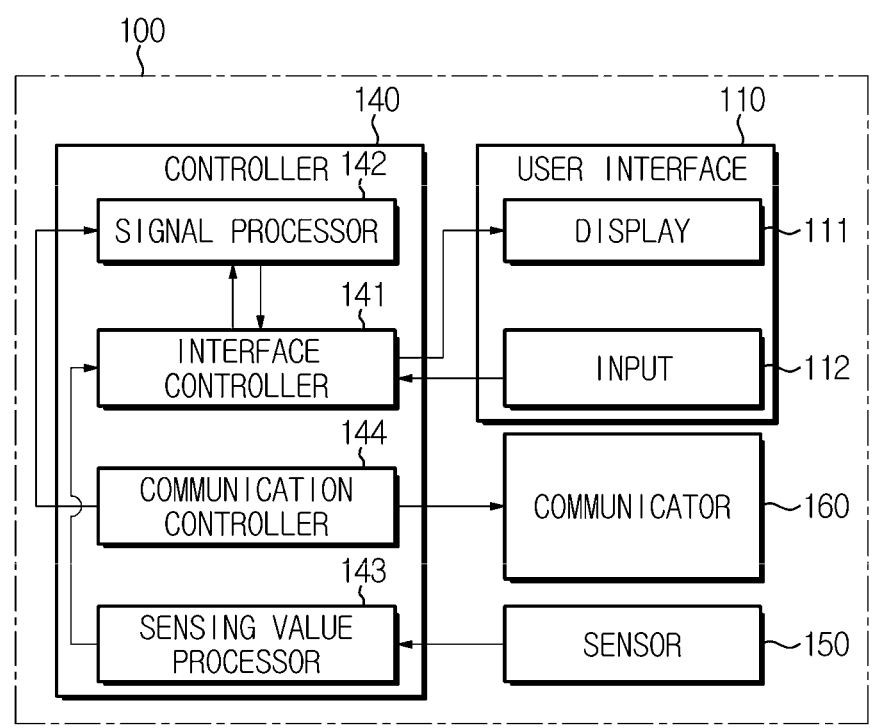
FIG. 5 illustrates a control block diagram of a display apparatus according to another embodiment of the present disclosure.

Hereinafter, the configuration of the display apparatus 100 according to another embodiment will be described. FIG. 5 illustrates a control block diagram of a display apparatus according to another embodiment of the present disclosure.

The display apparatus 100 according to another embodiment includes the user interface 110, the controller 140 and the sensing device 150, and may further include a communicator 160.

The implementation types and functions of the user interface 110, the sensing device 150, the interface controller 141, the signal processor 142 and the sensing value processor 143 of the controller 140 included in the display apparatus 100 according to another embodiment are the same as those of the user interface 110, the sensing device 150, the interface controller 141, the signal processor 142 and the sensing value processor 143 of the controller 140 included in the display apparatus 100 according to an embodiment, and thus duplicated description will be omitted.

The display apparatus 100 according to another embodiment may further include the communicator 160 instead of the storage 130.

The communicator 160 transmits and receives data to and from an external device via a wired or wireless communication network. For example, the communicator 160 may receive three-dimensional image data photographed at 360 degrees through a wire or wireless communication network from a server.

The communication network may include all kinds of wireless communication networks such as a cable communication network like a universal serial bus (USB), a high definition multimedia interface (HDMI), and a digital visual interface (DVI); a mobile radio communication network; or a satellite network; as well as a wired communication network such as a local area network (LAN), a wide area network (WAN) and a value added network (VAN).

To this end, although not shown, the communicator 160 may further include a receiving unit (not shown) for receiving image data. The receiving unit may include one of a wired communication module, a wireless communication module, and a local communication module, and may include a combination of the wired communication module, the wireless communication module, and the local communication module.

Also, the communicator 160 may include one tuner to individually receive analog and digital broadcast signals according to channel selection, or may include a plurality of tuners to receive analog and digital broadcast signals individually or simultaneously.

The image data or the broadcast signal received through the communicator 160 includes three-dimensional image data photographed at 360 degrees. Hereinafter, for convenience of explanation, it will be described as an example that the image data or the broadcast signal received through the communicator 160 is three-dimensional image data photographed at 360 degrees.

The controller 140 of the display apparatus 100 according to another embodiment may further include a communication control unit 144 for controlling the communicator 160.

The communication control unit 144 converts the image data received from the communicator 160 and transmits the converted image data to the signal processor 142, and generates a control signal so that the signal processor 142 converts the three-dimensional image data photographed at 360 degrees into a displayable three-dimensional image photographed at 360 degrees.

The communication control unit 144 may include a memory for storing programs and data for performing functions, and a processor for generating control signals according to the programs and data stored in the memory. According to an embodiment, the signal processor 142, the interface controller 141, the sensing value processor 143, and the communication control unit 144 may be implemented by separate memories and processors, respectively, or by a single memory and processor.

Figure 6A:
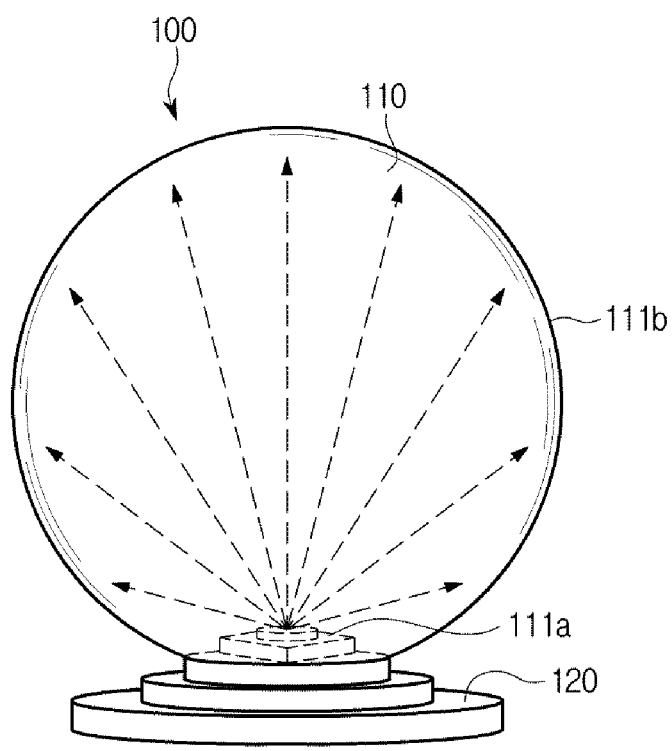
FIG. 6a illustrates an example of a display according to present disclosure.

Hereinafter, various embodiments of the display 111 will be described with reference to FIGS. 6a to 8. FIG. 6a is an example of a display, and FIG. 6b is another example of a display.

As described above, the display 111 implemented in a spherical form may be implemented as a flexible display including a light source or a three-dimensional display to directly display a three-dimensional image photographed at 360 degrees.

Also, as illustrated in FIG. 6a, the display 111 may be implemented to include a projector 111a and a stereoscopic projection plate 111b that projects a beam irradiated by the projector 111a to display a three-dimensional image photographed at 360 degrees. In this case, a user may view a three-dimensional image photographed at 360 degrees on the outer surface opposite to the inner surface of the display 111 on which the beam is projected.

Figure 6B:
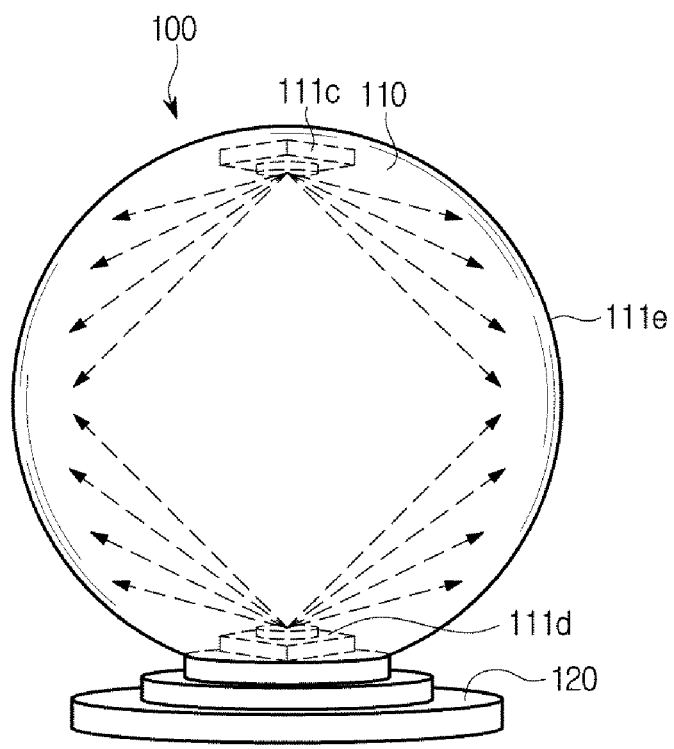
FIG. 6b illustrates another example of a display according to the present disclosure.

Also, as illustrated in FIG. 6b, the display 111 may be implemented to include a plurality of projectors 111c and 111d and a stereoscopic projection plate 111e that projects a beam irradiated by the projectors 111c and 111d to display a three-dimensional image photographed at 360 degrees. In this case, by combining the three-dimensional images photographed at 360 degrees which is projected by the plurality of projectors 111c and 111d, an image corresponding to the viewing angle of the object or the landscape may be displayed on the entire surface of the stereoscopic projection plate 111e in a spherical form.

Although only two of the projectors 111c and 111d are shown in FIG. 6B, it is also possible for the display 111 to include three or more of the projectors.

Figure 7:
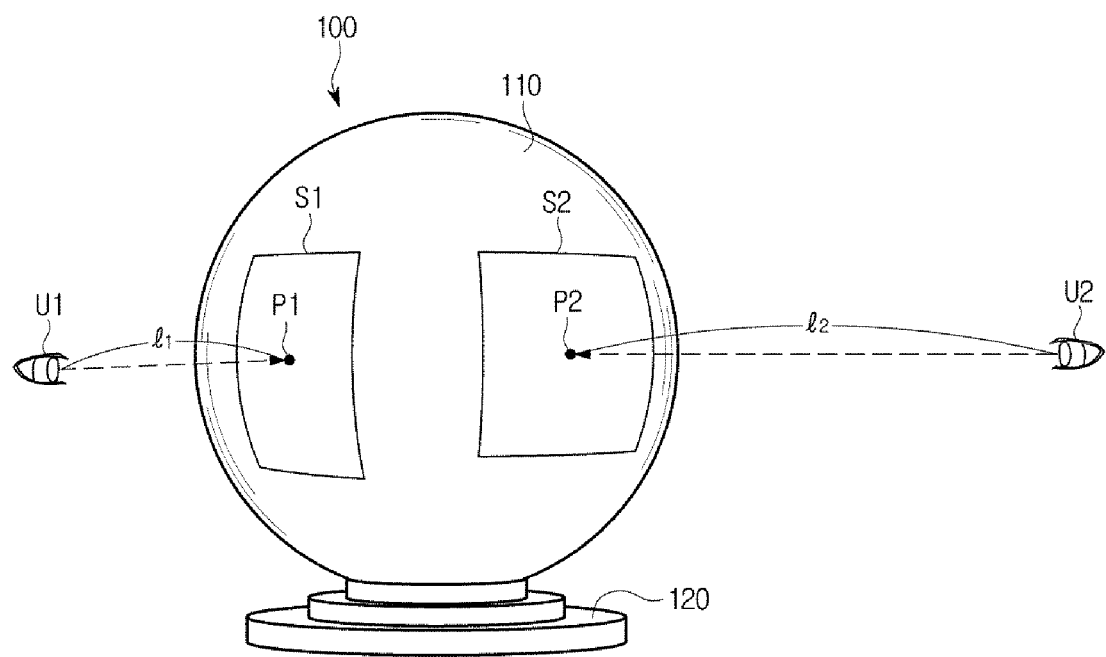
FIG. 7 illustrates an example of a display according to the present disclosure which outputs image contents corresponding to actions of users.
Figure 8:
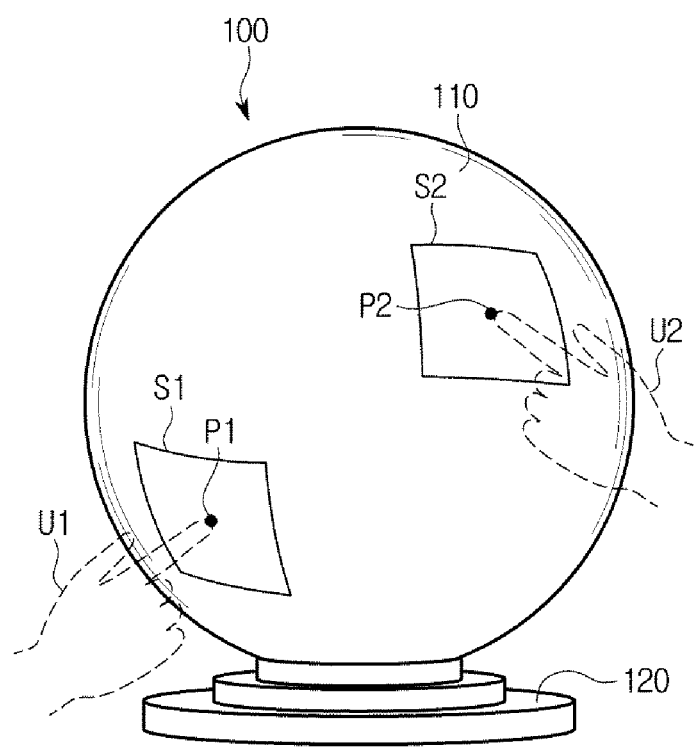
FIG. 8 illustrates an example of a display according to the present disclosure which outputs image contents corresponding to commands of users.

On the other hand, the display 111 may output various image contents according to an action or command of a user. FIG. 7 illustrates an example of a display which outputs image contents corresponding to actions of users, and FIG. 8 illustrates an example of a display which outputs image contents corresponding to commands of users.

Referring to FIG. 7, when the sensing value processor 143 generates a position of a first user U1 and a shortest distance 11 between the first user U1 and the display apparatus 100 as sensing result values, the interface controller 141 may control the display 111 to output a first image content S1 at a certain point P1 of the display 111 corresponding to the position of the first user U1 based on the sensing result values. In this case, the size of the output first image content S1 may be inversely proportional to the shortest distance 11 between the first user U1 and the display apparatus 100.

For example, when the first user U1 is sensed, in a state of displaying a three-dimensional image photographed at 360 degrees, the display 111 may further display a password input screen S1 for authenticating the first user U1 at the certain point P1.

Also, the sensing device 150 may sense a plurality of users U1 and U2. In this case, the sensing value processor 143 generates positions of the plurality of users U1 and U2, and shortest distances 11 and 12 between the respective users U1 and U2 and the display apparatus 100 as the sensing result values.

The interface controller 141, based on the sensing result values, may control the display 111 to output the first image content S1 at a first point P1 of the display 111 corresponding to the position of the first user U1, and may control the display 111 to output a second image content S2 at a second point P2 of the display 111 corresponding to the position of the second user U2.

The first image content S1 and the second image content S2 may be the same or different. For example, when the first user U1 and the second user U2 are determined as different users by the authentication process, the interface controller 141 may control the display 111 to output the first and second image contents S1 and S2 corresponding to the respective users at the first point P1 and the second point P2.

Also, referring to FIG. 8, when the input 112 receives a user command of the first user U1, the interface controller 141 may control the display 111 to output the image content S1 at any one point P1 of the display 111 corresponding to the user command. In this case, the display 111 may output the image content S1 around a certain point (the first point P1) of the display 111 corresponding to the user command.

For example, when the display 111 is implemented as a touch screen device and the first user U1 touches a certain point (the first point P1) of the display 111, the display 111 may further display the password input screen S1 for authenticating the first user U1 at a certain point (the first point P1) in a state of displaying the three-dimensional image photographed at 360 degrees.

Also, the input 112 may receive user commands of the plurality of users U1 and U2. In this case, the interface controller 141 may control the display 111 to output the first image content S1 corresponding to the user command of the first user U1, and, the interface controller 141 may control the display 111 to output the second image content S2 corresponding to the user command of the second user U2.

Also, although not shown, when the sensing value processor 143 generates a state of the display apparatus 100 or the surrounding environment as a sensing result value based on the sensing value of the sensing device 150, the display 111 may output image contents corresponding to the condition of the display apparatus 100 or the surrounding environment. For example, if the humidity is sensed to be above a preset reference humidity, the display 111 may display a three-dimensional image photographed at 360 degrees indicating that the humidity is high as image content.

Figure 9:
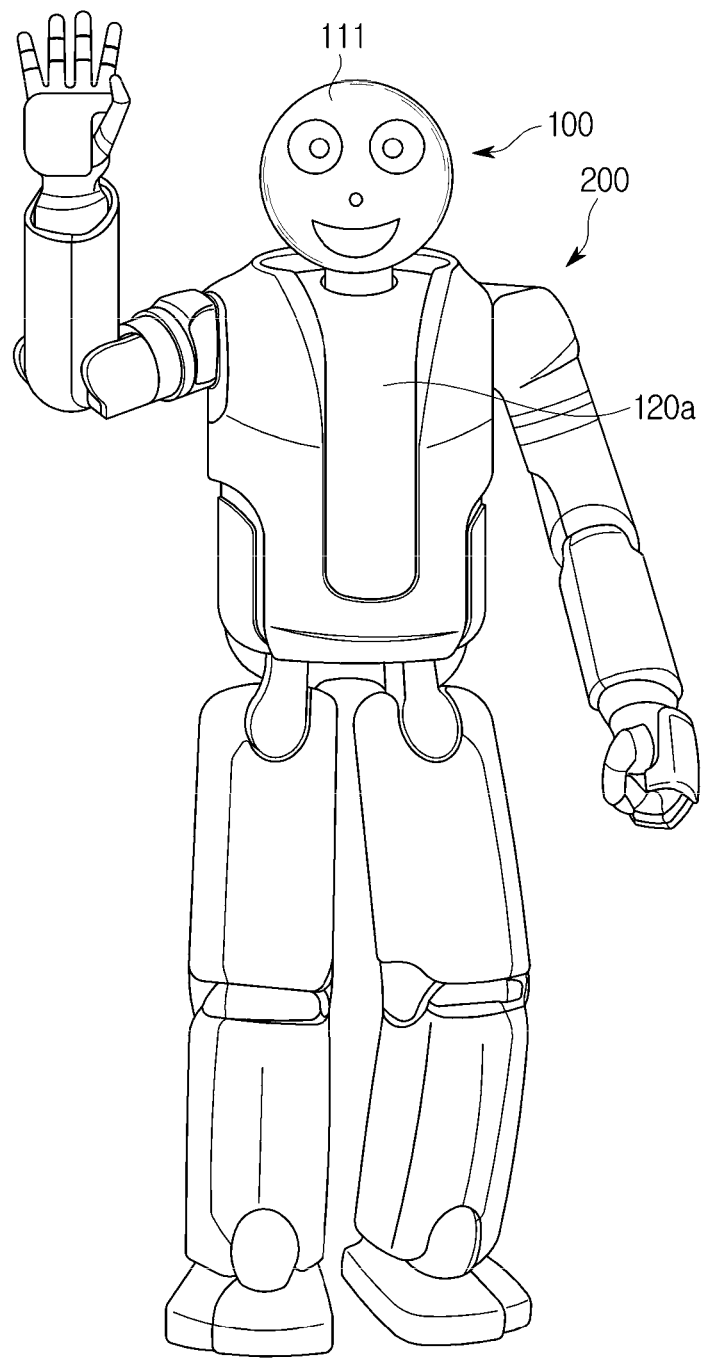
FIGS. 9 to 11 are illustrations of various embodiments of display apparatuses according to the present disclosure.
Figure 10:
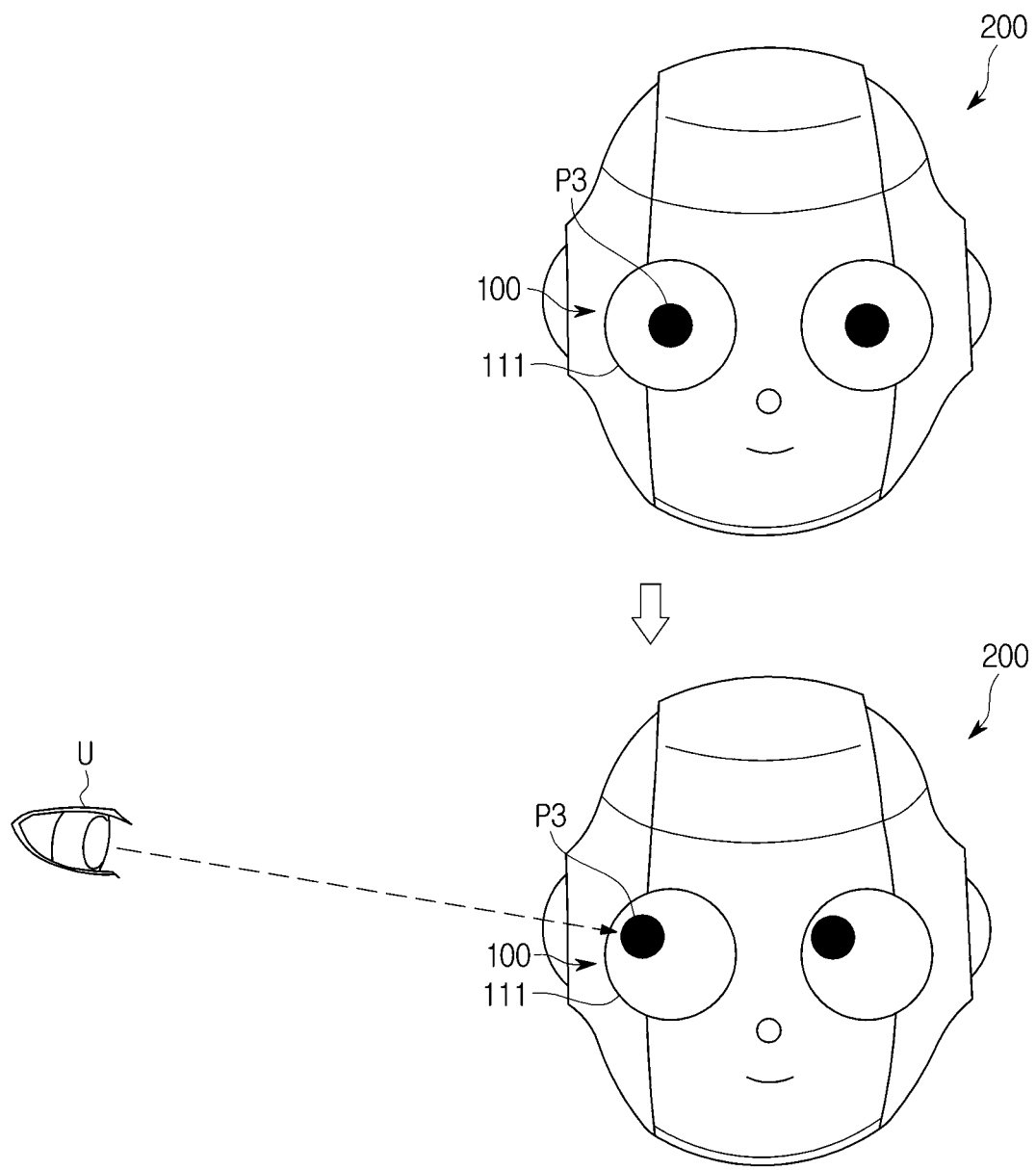
Figure 11:
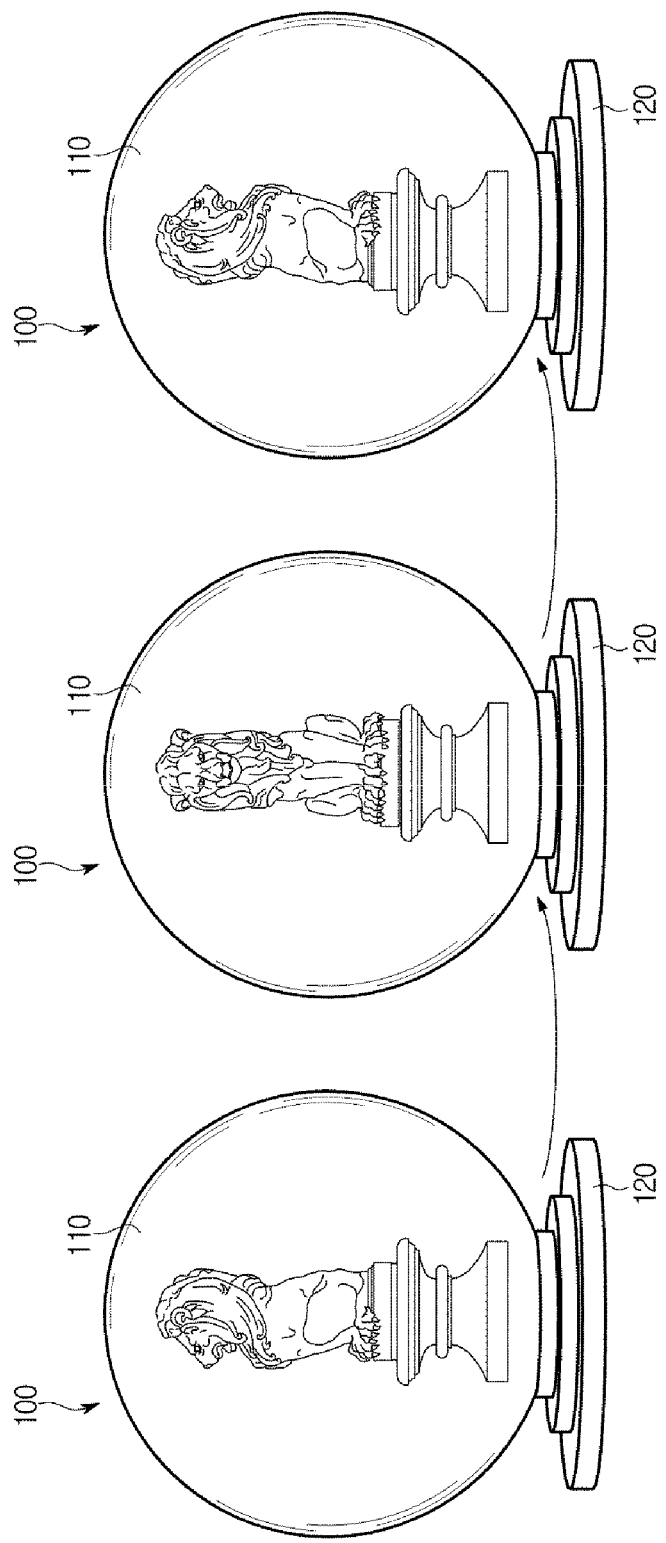

The display apparatus 100 may be variously implemented not only alone but also in combination with other apparatuses. FIGS. 9 to 11 are illustrations of various embodiments of display apparatuses according to the present disclosure.

As an example, referring to FIG. 9, the display 111 of the display apparatus 100 may be implemented as a head portion of a robot 200 and a support 120a may be implemented as a body of the robot 200. In this case, the display 111 of the display apparatus 100 may express various expressions of the robot 200 in a dynamic manner, and may three-dimensionally express the eyes, nose, and mouth as the face of an actual person. The expression of the robot 200 represented by the display 111 may vary depending on the action of the user sensed by the sensing device 150, the condition of the display apparatus 100, or the surrounding environment.

As another example, referring to FIG. 10, the display 111 of the display apparatus 100 may be implemented as an eyeball portion of the robot 200. In this case, the display 111 of the display apparatus 100 may move a position P3 of the pupil to correspond to the action of a user U sensed by the sensing device 150 or the condition of the display apparatus 100.

For example, when the user U is located on the right side of the robot 200, the interface controller 141 may control the display 111 so that the pupil of the robot 200 is positioned at a right side point P3 corresponding to the position of the user U.

As another example, referring to FIG. 11, the display apparatus 100 may be used for displaying artworks photographed at various angles.

In this case, the display 111 of the display apparatus 100 displays a three-dimensional image photographed at 360 degrees, so that the user may appreciate a three-dimensionally expressed artwork from various angles.

The three-dimensional image photographed at 360 degrees displayed by the display 111 may be a hologram image that may be viewed at all angles.

Also, although not shown, as another example, the display apparatus 100 may perform a dual monitor function in which a plurality of users may collaborate.

In addition, the display apparatus 100 may function as a apparatus for displaying three-dimensional images photographed variously at 360 degrees, such as providing a virtual reality as a three-dimensional image photographed at 360 degrees.

Figure 12:
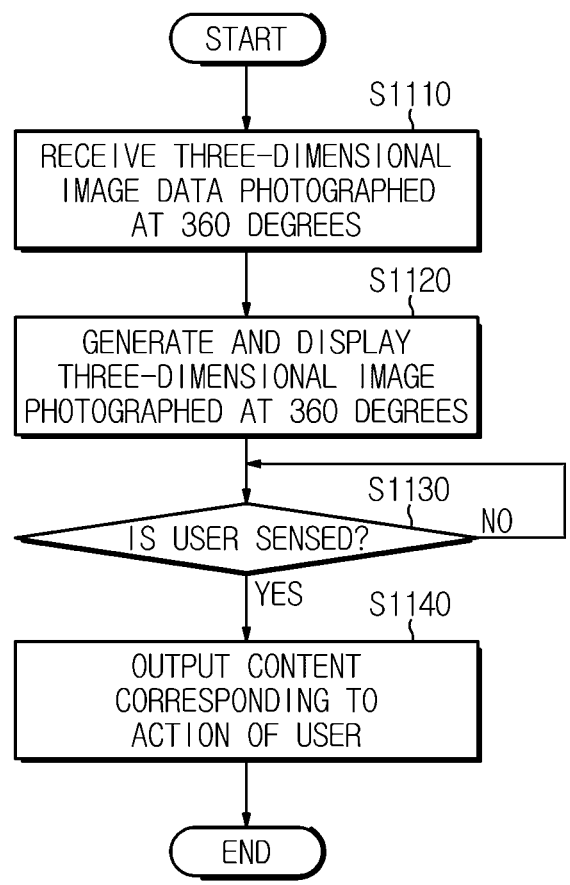
FIG. 12 illustrates a flowchart of a control method of a display apparatus according to an embodiment of the present disclosure.

Hereinafter, a method of controlling the display apparatus 100 according to an embodiment will be described with reference to FIG. 12. FIG. 12 illustrates a flowchart of a control method of a display apparatus according to an embodiment of the present disclosure. The components of the display apparatus shown in FIG. 12 are the same as those of the display apparatus described above with reference to FIG. 1 to FIG. 11, and thus duplicate description will be omitted.

First, a control method of the display apparatus 100 according to an embodiment receives a three-dimensional image signal photographed at 360 degrees (S1110).

The three-dimensional image signal photographed at 360 degrees may mean three-dimensional image data photographed at 360 degrees stored in the storage 130, and may mean three-dimensional image data photographed at 360 degrees received from an external device by the communicator 160.

The step of receiving the three-dimensional image signal photographed at 360 degrees may be performed by the signal processor 142 of the controller 140.

Then, the control method of the display apparatus 100 according to an embodiment generates a three-dimensional image photographed at 360 degrees based on the received three-dimensional image signal photographed at 360 degrees, and displays the generated three-dimensional image photographed at 360 degrees through the display 111 (S1120).

The step of generating the three-dimensional image photographed at 360 degrees may be performed by the signal processor 142 of the controller 140.

The step of displaying the three-dimensional image photographed at 360 degrees may include generating a control signal by the interface controller 141 of the controller 140 to display the generated three-dimensional image photographed at 360 degrees, and displaying the three-dimensional image photographed at 360 degrees on the display 111 based on the control signal.

Next, the control method of the display apparatus 100 according to an exemplary embodiment senses an action of the user such as the gesture, mouth shape, facial expression, or sound of the user (S1130).

The step of sensing the action of the user may be performed by the sensing device 150.

The action of the user to be sensed may be changed depending on the implementation of the sensing device 150.

The step of sensing the action of the user may include sensing the authentication information of the user, and the authentication information of the user includes various information items for verifying the identity of the user such as iris information, fingerprint information, and voice information.

Next, the control method of the display apparatus 100 according to an embodiment outputs the image content corresponding to the action of the user (S1140).

The step of outputting the image content may include a step of determining an action of a user by the sensing value processor 143 based on a sensing value of the sensing device 150, generating a sensing result value and determining image content corresponding to the sensing result value, a step of fetching the image content corresponding to the sensing result value by the signal processor 142 through the storage 130 or the communicator 160, a step of generating a control signal by the interface controller 141 so that the display 111 displays image content corresponding to the sensing result value, and a step of displaying the image content by the display 111 based on the control signal.

In this case, the display 111 may change the region of the image content to be displayed according to the action of the user.

In addition, when a plurality of users is sensed, the display 111 may output a plurality of image contents corresponding to each user.

The control method of the display apparatus 100 according to another embodiment may receive a user command and output image content corresponding to the user command.

The control method of the display apparatus 100 according to another embodiment may sense a condition of the display apparatus 100 and the surrounding environment, and output image content corresponding to a sensing result value.

It will be understood by those skilled in the art that various changes in form and details may be made therein without departing from the technical idea and essential features of the present disclosure. It is therefore to be understood that the above-described embodiments are illustrative in all aspects and not restrictive. For example, components described as being monolithic may be implemented as being separate, and components described as being separate may also be implemented in a combined form.

The scope of the present disclosure is to be defined by the appended claims rather than the detailed description, and all changes or modifications derived from the meaning and scope of the claims and their equivalents are to be construed as being included within the scope of the present disclosure.

The invention claimed is:

1. A display apparatus comprising:
a user interface implemented in a spherical form;
a sensing device configured to sense a location of a user near the display apparatus; and at least one processor configured to:
  determine a point on the user interface that has a shortest distance to the location,
  control the user interface to display a three-dimensional image photographed at 360 degrees, and
  control the user interface to output image content at the point on the user interface.

2. The display apparatus according to claim 1, wherein the user interface is implemented as a flexible display configured to directly display the three-dimensional image based on a control signal from the at least one processor.

3. The display apparatus according to claim 1, wherein the user interface comprises:
  at least one projector configured to irradiate a beam, and
  a stereoscopic projection plate configured to project the beam.

4. The display apparatus according to claim 3, wherein the at least one projector comprises a first projector which irradiates a first beam and a second projector which irradiates a second beam.

5. The display apparatus according to claim 1, wherein the user interface comprises:
  a display implemented as a touch screen device.

6. The display apparatus according to claim 1,
  wherein the sensing device is further configured to sense actions of a plurality of users, and
  wherein the at least one processor is further configured to control the user interface to individually output image contents corresponding to the actions of the plurality of users, respectively.

7. The display apparatus according to claim 1,
  wherein the user interface comprises:
    a display for displaying the three-dimensional image, and
    an input for receiving a command of the user, and
  wherein the at least one processor is further configured to control the display to output image content corresponding to the command of the user.

8. The display apparatus according to claim 7,
  wherein the input is configured to receive commands of a plurality of users, and
  wherein the at least one processor is further configured to control the display to individually output image contents corresponding to the commands of the plurality of users, respectively.

9. The display apparatus according to claim 1,
  wherein the sensing device configured to sense a condition of the display apparatus or a surrounding environment, and
  wherein the at least one processor is further configured to control the user interface to output image content corresponding to the condition or the surrounding environment.

10. The display apparatus according to claim 1, further comprising:
  a storage configured to store three-dimensional image data,
  wherein the at least one processor is further configured to control the user interface to display the three-dimensional image based on the three-dimensional image data in the storage.

11. The display apparatus according to claim 10, further comprising:
  a communicator configured to receive the three-dimensional image data,
  wherein the at least one processor is further configured to control the user interface so that the three-dimensional image is displayed based on the three-dimensional image data received by the communicator.

12. The display apparatus according to claim 1, wherein the display apparatus is implemented as a head or an eye of a robot.

13. The display apparatus according to claim 1, wherein the sensing device is further configured to sense a distance between the display apparatus and the user.

14. The display apparatus according to claim 1, wherein a size of the image content that is output by the user interface is based on the shortest distance.

15. The display apparatus according to claim 14, wherein the size of the image content that is output by the user interface is inversely proportional to the shortest distance.

16. A control method of a display apparatus, the method comprising:
  displaying a three-dimensional image photographed at 360 degrees on a user interface implemented in a spherical form;
  sensing a location of a user near the display apparatus;
  determining a point on the user interface that has a shortest distance to the location; and
  displaying image content at the point on the user interface.

17. The method of claim 16, further comprising:
  receiving a command of the user; and
  displaying other image content corresponding to the command of the user on the user interface.

18. The method of claim 16, further comprising:
  sensing a condition of the display apparatus or a surrounding environment; and
  outputting the image content on the user interface corresponding to the condition or the surrounding environment.

* * * * *